United States Patent
Tomimatsu

[11] Patent Number: 5,870,223
[45] Date of Patent: Feb. 9, 1999

[54] MICROSCOPE SYSTEM FOR LIQUID IMMERSION OBSERVATION

[75] Inventor: Kei Tomimatsu, Tokyo, Japan

[73] Assignee: Nikon Corporation, Tokyo, Japan

[21] Appl. No.: 897,641

[22] Filed: Jul. 21, 1997

[30] Foreign Application Priority Data

Jul. 22, 1996 [JP] Japan .................................... 8-192571
Jul. 23, 1996 [JP] Japan .................................... 8-193743

[51] Int. Cl.$^6$ .......................... G02B 21/34; G02B 21/00; G02B 1/06
[52] U.S. Cl. .......................... 359/392; 359/665; 359/398
[58] Field of Search ................................ 359/392, 665, 359/398; 356/246

[56] References Cited

U.S. PATENT DOCUMENTS

| | | | |
|---|---|---|---|
| 3,141,548 | 7/1964 | Newby | 359/398 |
| 3,202,049 | 8/1965 | Bond | 359/665 |
| 3,648,587 | 3/1972 | Stevens | 359/794 |
| 4,334,736 | 6/1982 | Herbert | 359/665 |
| 4,429,956 | 2/1984 | Herbert | 359/665 |
| 4,599,315 | 7/1986 | Terasaki et al. | 359/398 |
| 4,722,598 | 2/1988 | Ford | 359/398 |

FOREIGN PATENT DOCUMENTS

| | | | |
|---|---|---|---|
| 1278135 | 9/1968 | Germany | 359/665 |
| 1472294 | 2/1969 | Germany | 359/665 |

*Primary Examiner*—Jon Henry
*Attorney, Agent, or Firm*—Chapman and Cutler

[57] ABSTRACT

A microscope for observing a specimen immersed in an immersion liquid within a specimen container includes an objective lens and utilizes a sealed container containing a second liquid that has substantially the same refractive index as the immersion liquid. The sealed container is positioned between the objective lens and the specimen. Alternatively, the microscope for observing the specimen immersed in the immersion liquid can utilize a container opening toward the objective lens. A method of observing the specimen includes the steps of positioning a container containing a liquid, with substantially the same refractive index as an immersion liquid within a specimen container, between a microscope objective lens and the specimen and observing the specimen through the objective lens.

19 Claims, 5 Drawing Sheets

MICROSCOPE SYSTEM FOR LIQUID IMMERSION OBSERVATION

BACKGROUND OF THE INVENTION

1. Field of the Invention

This invention relates to a microscope and, more particularly, to a microscope for observing a specimen, immersed in a liquid within a container, through the liquid and the container.

2. Description of Related Art

When a specimen, which is immersed in a liquid having a certain depth, is observed through a microscope, the thickness of the liquid layer located between the objective lens and the specimen varies depending on the position or degree of depth at which the specimen is located in the liquid. Simply using an ordinary objective lens is insufficient to obtain a satisfactory image of the specimen at any position in the liquid because the spherical aberration of the objective lens changes over a wide range according to the position of the specimen. Consequently, a specimen in a liquid is conventionally observed by one of two methods. The first of these methods involves using an objective lens having a function for correcting a spherical aberration according to the thickness of the liquid layer existing between the specimen and the objective lens. The second method involves filling the space between the objective lens and the container or the cover slip for the specimen with a small amount of liquid that has the same refractive index as the immersion liquid, and maintaining the liquid in position through the surface tension of the liquid itself.

A focusing operation and a manipulation of the aberration correcting mechanism must follow movement of the specimen in the first method. Accordingly, the overall operation of the microscope becomes complicated and troublesome. It is also difficult to stably obtain a satisfactory image.

The second method is limited to use in situations in which the working distance of the objective lens is short. If the working distance of the objective lens is long, then the surface tension of the liquid between the objective lens and the container can not be maintained.

When such a conventional microscope is used in a "weightless" or "gravity-free" environment, the drawbacks mentioned above are still present.

SUMMARY OF THE INVENTION

It is an object of this invention to provide a microscope for observing a specimen, immersed in a liquid, through the liquid and a container for the liquid and for readily obtaining a high-quality observed image. In general, even when the specimen in the immersion liquid is in focus, the observed image is deteriorated by spherical aberration which is caused when the thickness of the liquid layer lying between the objective lens and the specimen differs from a preset value. The best way to prevent such a situation is to maintain constant thicknesses of the media (i.e., the liquid and the container) existing between the objective lens and the specimen while using an objective lens which is specifically designed to take the situation mentioned above into account.

However, even if these conditions are satisfied, the problems mentioned above in connection with the second method will still be present when only surface tension of the liquid itself is relied on to keep the space between the objective lens and the container filled with a certain amount of the liquid.

A specimen immersed in an immersion liquid is observed through a microscope having an objective lens according to one aspect of the invention. A container, which opens toward the objective lens, is provided on the side of the microscope stage facing the objective lens. The container is filled with a liquid that has the same refractive index as the immersion liquid in which a specimen is immersed. The end face of the objective lens is immersed in the liquid within the container. If the microscope is an inverted microscope and gravity exists, then the liquid connot be kept contained in the container unless the entire system is oriented upside down because the container is open toward the objective lens. However, in a gravity-free environment, this open container arrangement is usable together with an inverted microscope because the liquid can be kept contained in the container by the surface tension of the liquid and the wetting property of the liquid surface even when the container opens downwardly.

In such an arrangement, even when the objective lens is relatively moved up and down to focus on the specimen, the total thickness of the immersion liquid and the liquid in the container is maintained constant no matter where the specimen is positioned in the immersion liquid. Preferably, the objective lens is specifically designed to be suitable for this purpose. As a result, a spherical aberration of the objective lens does not change. Thus, a satisfactory and stable image of the specimen is obtained. Because the liquid stays in the container without flowing out, an objective lens with a long operation range can be used as long as a sufficient amount of liquid is filled in the container. The purpose of the container is to keep the liquid filled between the objective lens and the specimen container. The container may be a part of either the microscope main body or the specimen container. Alternatively, the container may be a separate container as long as it opens toward the objective lens.

According to another aspect of the invention, a transparent liquid that has the same refractive index as the immersion liquid is filled in a sealed flexible container or pouch. A part of the flexible container is transparent so as not to block the optical path. The sealed flexible container is inserted between the objective lens and the specimen container. The shape of the sealed flexible container and the thickness of the liquid contained therein change according to the focusing operation. Accordingly, the total thickness of the immersion liquid and the sealed liquid is maintained constant. If an objective lens that is specifically designed for this purpose is used, then a spherical aberration of the objective lens does not change, and a satisfactory and stable image of the specimen is obtained. Because the liquid is sealed within the flexible container, splashing or evaporation of the liquid, which adversely affects the surroundings, can be avoided. This flexible container is applicable to an inverted microscope.

In an actual operation, a spherical aberration correction device is still required for the objective lens because of variations in the thickness or material of an observation (specimen) container. However, it is adequate to correct for spherical aberration only at the beginning of observation. This is advantageous as compared with a conventional microscope which requires correction for spherical aberration every time focusing is performed.

BRIEF DESCRIPTION OF THE DRAWINGS

The above and other objects, features, and advantages of the present invention are further described in the detailed description which follows. Reference is made to the drawings showing non-limiting exemplary embodiments of the present invention in which.

DESCRIPTION OF THE PREFERRED EMBODIMENTS

Figure 1:
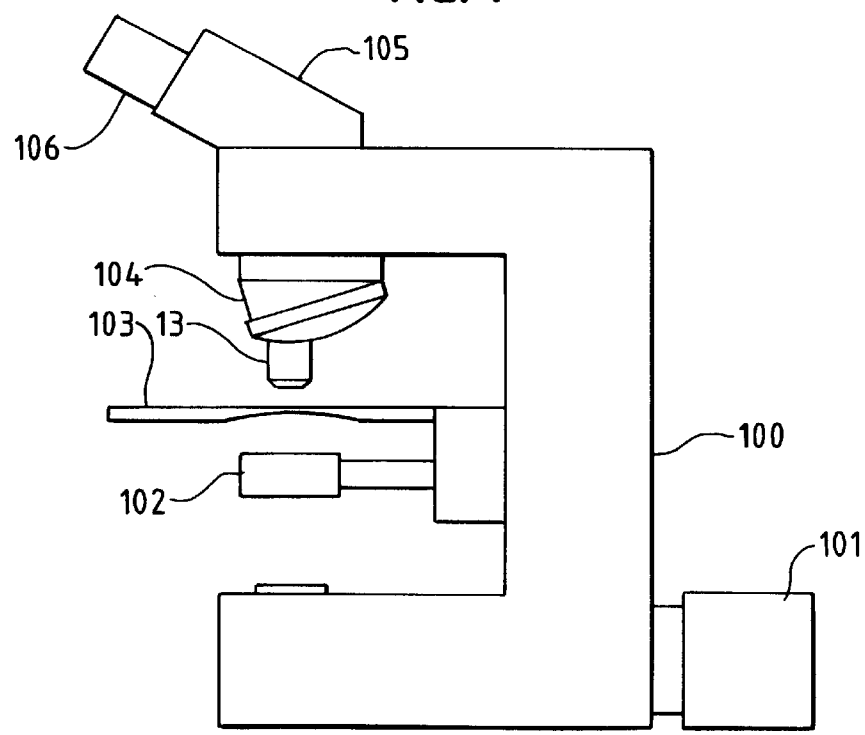
FIG. 1 is a schematic diagram of an upright microscope to which the present invention is applicable.

FIG. 1 illustrates an example of an upright microscope according to the first embodiment of the invention. A lamp unit 101 which includes a light source is fixed to the base 100. Illumination light emitted from the lamp unit 101 passes through the inside of the base 100 and the substage condenser 102, and illuminates a specimen mounted on the stage 103.

Figure 2A:
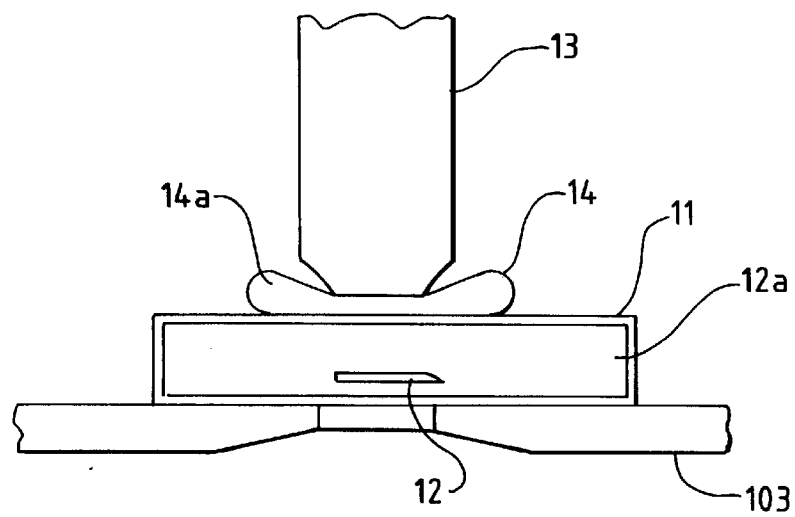
FIGS. 2A and 2B illustrate major parts of the microscope according to a first embodiment of the invention.
Figure 2B:
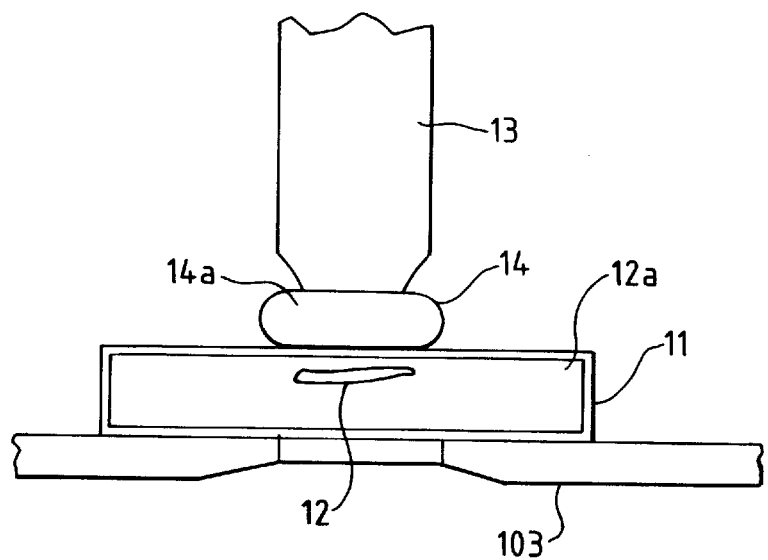

FIGS. 2A and 2B illustrate the major parts of the microscope shown in FIG. 1. A plastic container 11, in which a specimen 12 and an immersion liquid 12a are sealed, is mounted on the stage 103. An objective lens 13 is positioned above the specimen container 11 to form an image of the specimen 12.

A thin transparent pouch 14, in which a liquid 14a having substantially the same refractive index as the immersion liquid is sealed, is inserted between the specimen container 11 and the objective lens 13. The pouch 14 is made of, for example, resin (e.q., plastic) and acts like a water cushion. In this embodiment, water is used as the immersion liquid 12a and the liquid sealed within the pouch 14.

The pouch 14 directly contacts the specimen container 11 and the objective lens 13. It is preferable to apply a small amount of liquid to the end face of the objective lens 13 and the top surface of the specimen container 11 to form a very thin liquid layer. This produces better contact between both the pouch 14 and the objective lens 13 and the pouch 14 and the specimen container 11. The thin liquid layer also has an antireflection effect for preventing reflection at the interface. The pouch 14 and the specimen container 11, or the pouch 14 and the end face of the objective lens 13, may be bonded to each other. Alternatively, the pouch 14 may be bonded to both the specimen container 11 and the end face of the objective lens 13.

Referring back to FIG. 1, the objective lens 13 is fixed to the revolver 104 which is attached to the base 100. The objective lens 13 forms an intermediate image of the specimen 12 by itself or in combination with an imaging lens provided within a viewing tube 105. The intermediate image is observed through an eyepiece 106 which is attached to the viewing tube 105.

The operation of the microscope of the first embodiment will now be explained. If the specimen 12 is positioned apart from the objective lens 13 within the specimen container 11, as shown in FIG. 2A, then the space between the objective lens 13 and the specimen container 11 is made narrow to focus on the specimen 12. At this time, the center portion of the pouch 14 is squashed by the end face of the objective lens 13. On the other hand, if the specimen 12 is positioned near the objective lens 13 within the container 11, as shown in FIG. 2B, then the space between the objective lens 13 and the specimen container 11 is made broad to focus on the specimen 12. The squashed center portion of the pouch 14 recovers or swells because of the pressure within and the elasticity of the material of the pouch 14. Thus, the optical condition in the optical path extending from the specimen 12 to the objective lens 13 is maintained constant, regardless of the position (depth) of the specimen 12 in the container 11. Accordingly, a focusing operation is simply performed during the observation of the specimen 12 and without correcting for a spherical aberration every time focusing is performed. A high-quality image of the specimen 12 can be stably obtained through a simplified observation process.

If the durability of the area in which the objective lens 13 and the pouch 14 or the pouch 14 and the specimen container 11 directly contact each other is low, then this portion may be reinforced by a hard transparent material such as glass.

The second embodiment will be described with reference to FIGS. 3, 4A and 4B.

Figure 3:
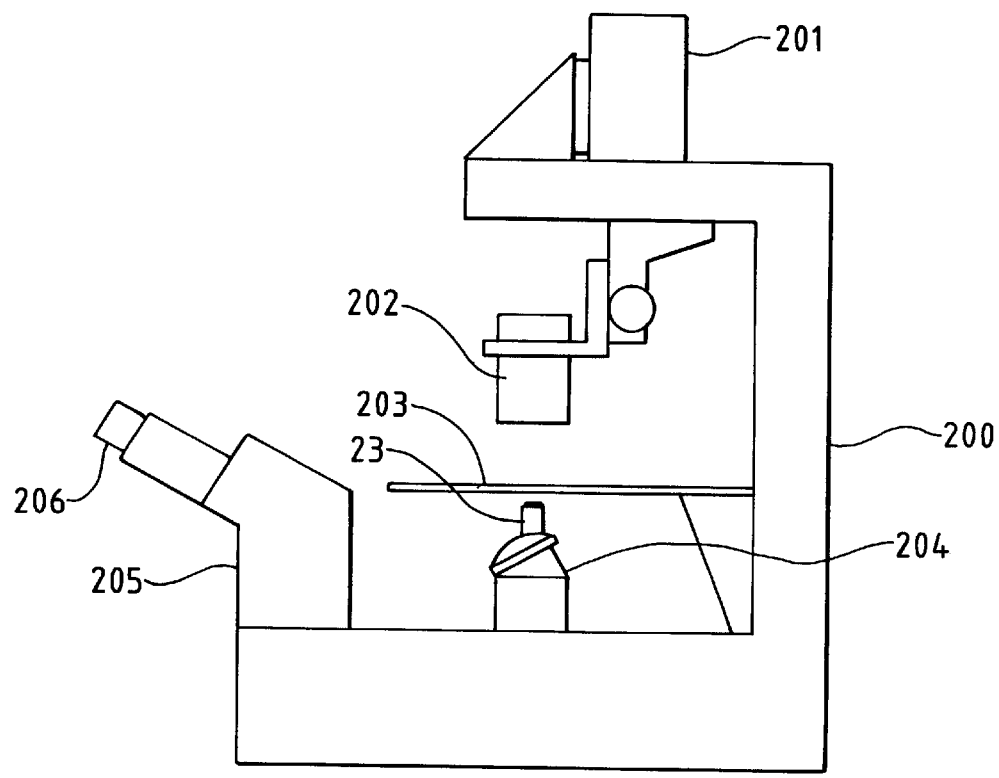
FIG. 3 is a schematic diagram of an inverted microscope to which the present invention is applicable.

FIG. 3 shows the structure of an inverted microscope. A lamp unit 201 which includes a light source is fixed to the base 200. Illumination light emitted from the lamp unit 201 passes through the condenser 202, which is also fixed to the base 200, and illuminates a specimen mounted on the stage 203.

In the second embodiment, a Petri dish 21 is put on the stage 203. A specimen 22 is immersed in an immersion liquid 22a within the Petri dish 21. The stage 203 has an observation hole into which a thin transparent glass plate 25 is fitted. A frame 24a is fixed to the back surface of the stage 203. The frame 24a is sealed with a thin transparent film 24b. The back surface of the stage 203, the glass plate 25, the frame 24a, and the film 24b form a space in which a liquid 24c that has the same refractive index as the immersion liquid 22a is contained. In this embodiment, water is used as the immersion liquid 22a and the liquid 24c. During observation, the end face of the objective lens 23 directly contacts the film 24b.

Referring again to FIG. 3, the objective lens 23 is fixed to the revolver 204 which is fixed to the base 200. The objective lens 23 forms an intermediate image of the specimen 22 by itself or combined with an imaging lens within a viewing tube 205. The intermediate image is observed through an eyepiece 206 attached to the viewing tube 205.

Figure 4A:
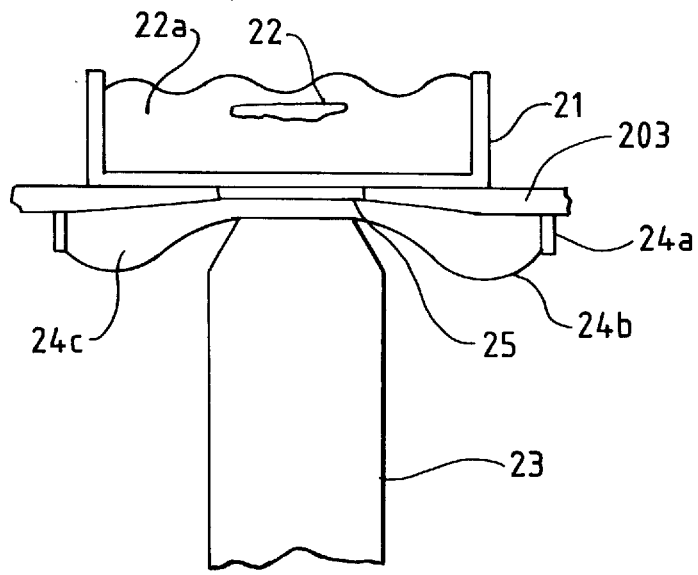
FIGS. 4A and 4B illustrate major parts of the microscope according to a second embodiment of the invention.

Regarding the operation using the microscope of the second embodiment, if the specimen 22 is positioned in the upper portion of the immersion liquid 22a, as shown in FIG. 4A, then the space between the objective lens 23 and the stage 203 is made narrow to focus on the specimen 22. At this time, the center portion of the film 24b is pushed by the end face of the objective lens 23, and the liquid 24c flows toward the peripheral portion within the frame 24a. Thus, the thickness of the liquid layer 24c becomes thin at the center portion.

Figure 4B:
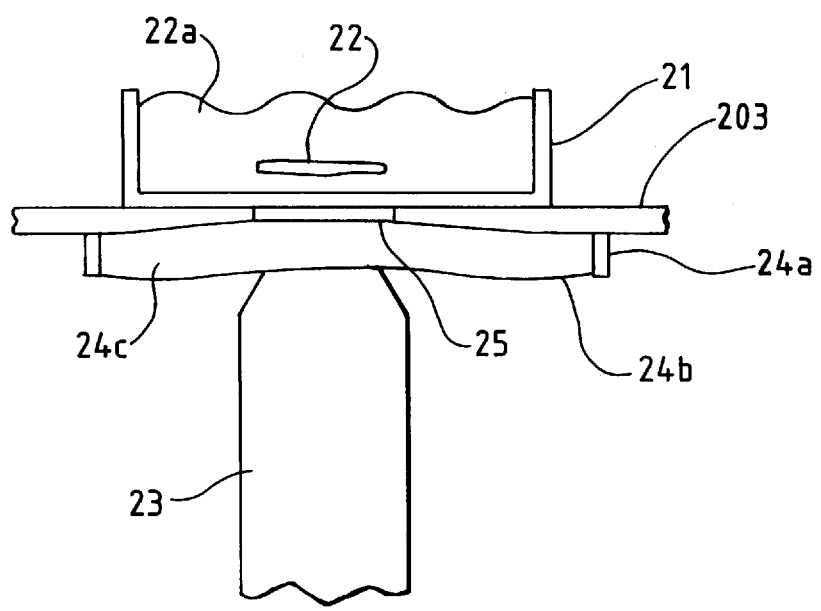

On the other hand, if the specimen 22 is positioned near the bottom of the Petri dish 21, as shown in FIG. 4B, then the space between the objective lens 23 and the stage 203 is made broad to focus on the specimen 22. The end face of the objective lens 23 is lowered, and the liquid 24c flows into the center portion from the periphery. Thus, the liquid layer 24c becomes thick. The optical condition in the optical path from the specimen 22 to the objective lens 23 is maintained constant, regardless of the position (depth) of the specimen 22 in the Petri dish. Accordingly, a focusing operation is simply performed for observation of the specimen 22. A high-quality and stable image of the specimen 22 can be obtained while the need to correct for a spherical aberration of the objective lens 23 is eliminated.

If the durability of the portion of the film 24b that directly contacts the end face of the objective lens 23 is low, then that portion may be reinforced by a hard and transparent material, such as glass.

According to the first and second embodiments, the specimen immersed in the liquid within the specimen container can be reliably observed by simply focusing on the specimen. This is advantageous as compared with the conventional method, in which focusing and correction of a spherical aberration must be performed simultaneously. Moreover, since the liquid is sealed within a pouch or frame, adverse influences produced by splashing or flow of the liquid can be avoided.

In the first and second embodiments, the thickness of the liquid layer is passively controlled by utilizing a focusing operation. However, the thickness of the liquid layer may be actively controlled using a piston or pump which is activated in conjunction with the focusing operation.

Figure 5A:
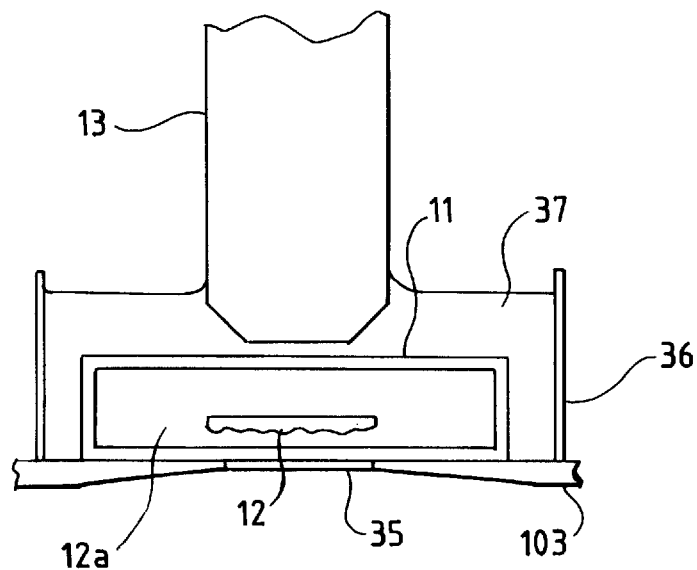
FIGS. 5A and 5B illustrate major parts of the microscope according to a third embodiment.
Figure 5B:
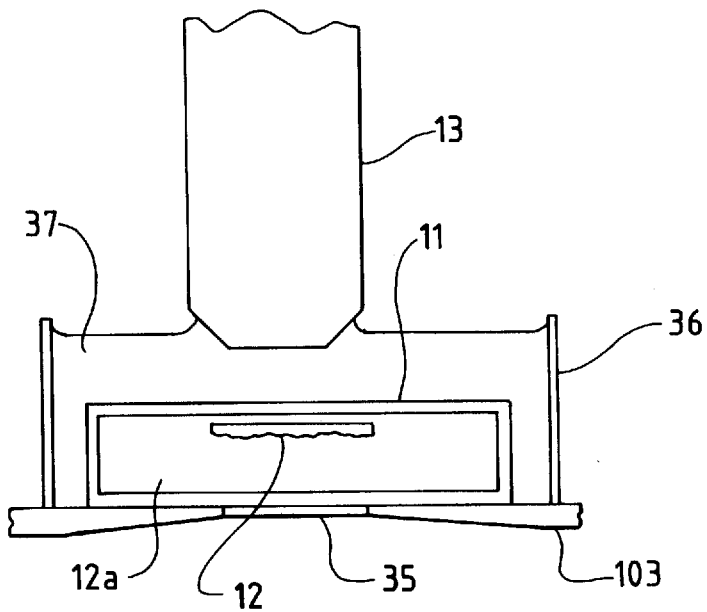

FIGS. 5A and 5B illustrate major parts of the microscope according to the third embodiment. The microscope of the third embodiment is an upright microscope similar to the first embodiment. In FIGS. 5A and 5B, the same or equivalent elements are denoted by the same reference numbers or characters as in FIG. 1.

As shown in FIGS. 5A and 5B, a plastic container 11, in which a specimen 12 and an immersion liquid 12a are sealed, is mounted on the stage 103. The specimen 12 is illuminated by the lamp unit (not shown) in a manner similar to that of the first embodiment. An objective lens 13 is positioned above the specimen container 11 to form an image of the illuminated specimen 12. The stage 103 has an observation aperture into which a thin transparent glass plate 35 is fitted. A frame 36 is attached to the top surface of the stage 103. The frame 36, the stage 103, and the glass plate 35 form a container containing a liquid 37 that has the same refractive index as the immersion liquid 12a. In this embodiment, water is used as the immersion liquid 12a and the liquid 37.

During observation, the end face of the objective lens 13 is directly immersed into the liquid 37 contained in the frame 36.

When using the microscope of the third embodiment, if the specimen 12 is positioned apart from the objective lens 13 within the container 11, as shown in FIG. 5A, then the space between the objective lens 13 and the specimen container 11 is made narrow to focus on the specimen 12. At this time, the thickness of the liquid layer 37 lying between the objective lens 13 and the specimen container 11 becomes thin.

If the specimen 12 is positioned near the objective lens 13 within the container 11, as shown in FIG. 5B, then the space between the objective lens 13 and the specimen container 11 is made broad to focus on the specimen 12, and the liquid layer 37 lying between the objective lens 13 and the specimen container 11 becomes thick (deep).

The depth or thickness of the liquid layer existing between the specimen 12 and the objective lens 13 is always kept constant, regardless of the position (depth) of the specimen 12 within the container 11.

The specimen immersed in the liquid can be reliably observed by simply focusing on the specimen. This is advantageous as compared with the conventional method, in which focusing and correction for a spherical aberration must be performed simultaneously.

Figure 6A:
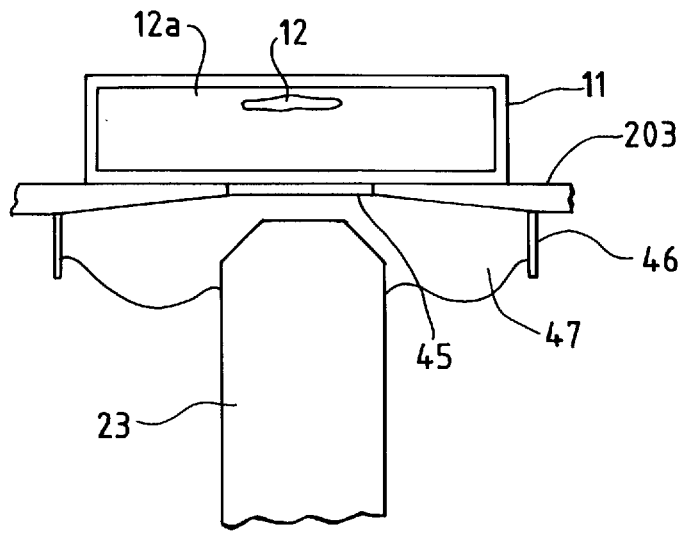
FIGS. 6A and 6B illustrate major parts of the microscope according to a fourth embodiment.
Figure 6B:
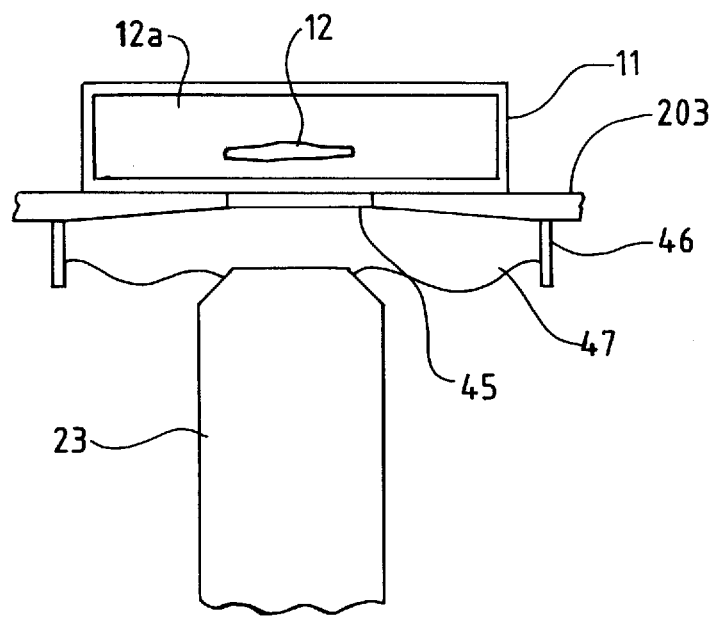

FIGS. 6A and 6B illustrate another example of an inverted microscope. The inverted microscope shown in these figures is used in a gravity-free environment. The overall structure of the inverted microscope of the fourth embodiment is similar to that shown in FIG. 3. The same reference numbers or characters are used to indicate the same or equivalent elements in FIGS. 3, 6A and 6B.

A plastic container 11, in which a specimen 12 and an immersion liquid 12a are sealed, is mounted on the stage 203. The stage 203 has an observation aperture into which a thin transparent glass plate 45 is fitted. A frame 46 is attached to the back surface of the stage 203. The frame 46, the stage 203 and the glass plate 45 form a container in which a liquid 47 that has the same refractive index as the immersion liquid 12a is contained. Because the microscope is used in a gravity-free environment in this embodiment, the liquid 47, contained in the frame which opens downward, is retained in the frame by the wetting property and the surface tension of the liquid 47. Water is used as the immersion liquid 12a and the liquid 47.

During observation, the end face of the objective lens 23 is directly immersed into the liquid 47 contained in the frame 46.

In operation, when using the microscope of the fourth embodiment, if the specimen 12 is positioned apart from the objective lens 23 within the specimen container 11, as shown in FIG. 6A, then the space between the objective lens 23 and the specimen container 11 is made narrow so as to focus on the specimen 12. The thickness of the liquid layer 47 lying between the objective lens 13 and the specimen container 11, therefore, becomes thin.

If the specimen 12 is positioned near the objective lens 23 within the container 11, as shown in FIG. 6B, then the space between the objective lens 13 and the specimen container 11 is made broad so as to focus on the specimen 12. As a result, the liquid layer 47 lying between the objective lens 13 and the specimen container 11 becomes thick (deep). Thus, the depth or thickness of the liquid layer existing between the specimen 12 and the objective lens 23 is always kept constant, regardless of the position (depth) of the specimen 12 within the container. The surface of the liquid 47 is supported by the surface tension of the liquid 47 itself under the gravity-free condition.

The specimen immersed in the liquid can be reliably observed by simply focusing on the specimen. This is advantageous as compared with the conventional method, in which focusing and correcting for a spherical aberration must be performed simultaneously.

As is clear from the above description of the first through fourth embodiments, one of the helpful features of the invention is that the observation process for observing a specimen that is immersed in a liquid with a certain thickness within a container is remarkably facilitated as compared with the troublesome conventional process. This advantage exists because it is not necessary to correct for a spherical aberration of the objective lens every time focusing is performed.

While the invention has been described by way of certain embodiments, it is to be understood that the words which have been used herein are words of description rather than words of limitation. Changes may be made, within the purview of the appended claims, without departing from the scope and the spirit of the invention in its broader aspects.

I claim:

1. A microscope for observing a specimen immersed in an immersion liquid within a specimen container, the microscrope comprising:

an objective lens; and a sealed container containing a second liquid that has substantially the same refractive index as the immersion liquid and which is positioned between the objective lens and the specimen.

2. The microscope claimed in claim 1, wherein the microscope is an inverted microscope.

3. The microscope claimed in claim 1, wherein the sealed container is a deformable pouch.

4. The microscope claimed in claim 3, wherein said deformable pouch directly contacts both said objective lens and the specimen container.

5. The microscope claimed in claim 4, wherein said pouch is deformed by movement of one of said objective lens and said sealed container.

6. The microscope claimed in claim 1, and further comprising a first liquid layer between said objective lens and said sealed container and a second liquid layer between said sealed container and the specimen container.

7. The microscope claimed in claim 1, wherein said sealed container and the specimen container are bonded together.

8. The microscope claimed in claim 1, wherein said sealed container and an end face of said objective lens are bonded together.

9. The microscope claimed in claim 7, wherein a portion of said sealed container remote from said specimen container and an end face of said objective lens are bonded together.

10. The microscope claimed in claim 2, wherein the sealed container includes a frame extending downwardly relative to the specimen container and a thin transparent film sealing off the frame.

11. A microscope for observing a specimen immersed in an immersion liquid within a specimen container comprising:

an objective lens; and a container opening toward the objective lens, containing a second liquid that has substantially the same refractive index as the immersion liquid, and positioned between the objective lens and the specimen.

12. The microscope claimed in claim 11, wherein the microscope is an inverted microscope used in a gravity-free environment.

13. The microscope claimed in claim 11, wherein the container opening toward the objective lens includes a frame extending upwardly toward the objective lens and the objective lens has an end face which is immersed in said second liquid.

14. The microscope claimed in claim 11, wherein the container opening toward the objective lens includes a frame extending downwardly toward the objective lens and the objective lens has an end face which is immersed in said second liquid.

15. A method of observing a specimen immersed in an immersion liquid within a specimen container comprising the steps of:

positioning a container containing a second liquid with substantially the same refractive index as the immersion liquid between an objective lens of a microscope and the specimen; and observing the specimen through the objective lens.

16. The method claimed in claim 15, and further comprising the step of maintaining a constant distance between the specimen within the specimen container and an end face of the objective lens.

17. The method claimed in claim 15, wherein said container containing the second liquid is a sealed container.

18. The method claimed in claim 15, wherein said container containing the second liquid is an open container opening toward the objective lens.

19. The method claimed in claim 18, wherein the microscope is an inverted microscope used in a gravity-free environment.

* * * * *